D. S. HOWARD.
Combined Rollers and Irrigators.
No. 157,284.          Patented Dec. 1, 1874.
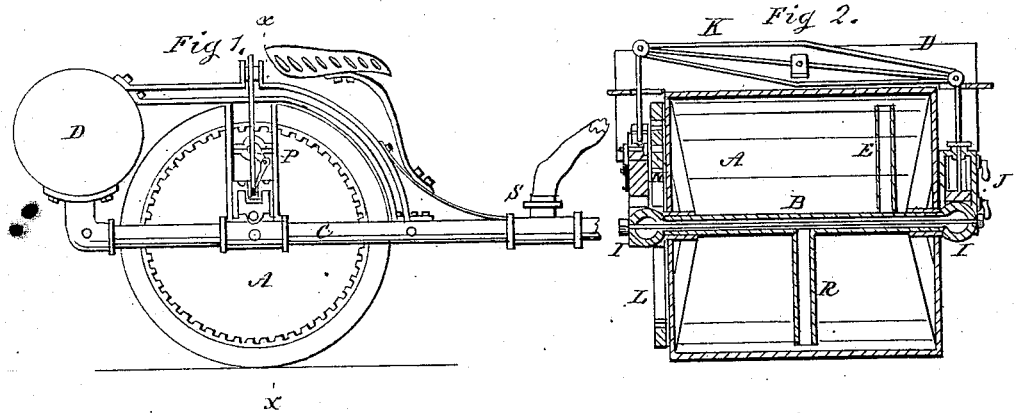
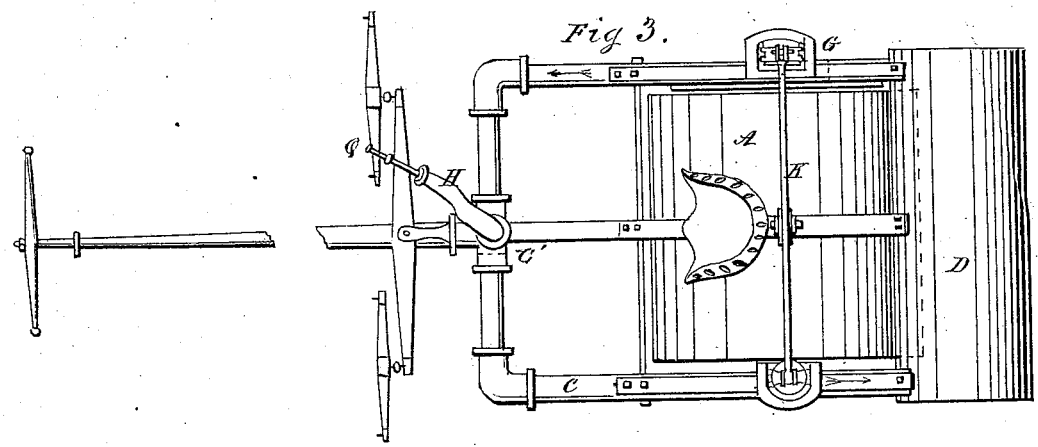
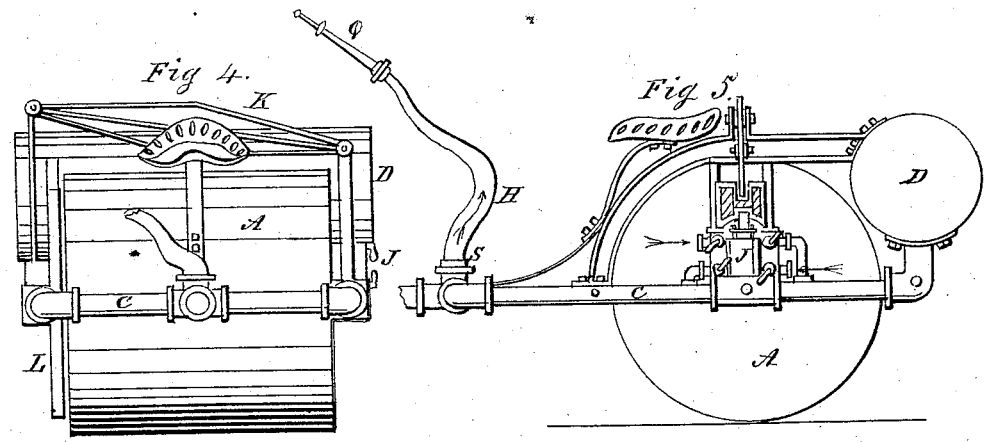
Witnesses.
Colborne Brookes
Chas Hadaway
Inventor.
Dean S Howard
by Atty W Morris Smith

UNITED STATES PATENT OFFICE.

DEAN S. HOWARD, OF DREWRY'S BLUFF, VIRGINIA.

IMPROVEMENT IN COMBINED ROLLERS AND IRRIGATORS.

Specification forming part of Letters Patent No. 157,284, dated December 1, 1874; application filed September 2, 1874.

*To all whom it may concern:*

Be it known that I, DEAN S. HOWARD, of Drewry's Bluff, in Chesterfield county and State of Virginia, have invented Improvements in Combined Roller and Irrigator, of which the following is a specification:

This invention, for the most part, embraces improvements on the apparatus patented to me June 17, 1873, No. 140,043, its object and design being to furnish an apparatus that will serve the several purposes of a land-roller, an irrigator, a distributer of liquid or finely-pulverized fertilizers, or of poisonous solutions or powders for destroying insects on trees or crops, and which may also be used as a reservoir for compressed air to be applied as a means of operating any light stationary machinery, such as sewing, churning, or the like. It consists in the combination, with a hollow roller, of a tubular framing and an air-chamber, said framing being diaphragmed, and so controlled by stop-cocks as to direct the current from the air-chamber to the roller, or vice versa, and in the combination therewith of a pump supported on the hollow framing, so constructed and provided with two or more stop-cocks as to be made to force air into the chamber, or to exhaust it therefrom, by the travel of the roller over the ground.

In the accompanying drawing forming part of this specification, Figure 1 represents a side elevation of the apparatus. Fig. 2 is a vertical section taken on the axial line of the roller. Fig. 3 is a top view of the apparatus. Fig. 4 is a front elevation. Fig. 5 is a side elevation, the reverse of Fig. 1.

The same letters occuring on the several figures indicate like parts.

A is a hollow roller, which, when used for breaking down lumps of earth, or to bring the soil properly in contact with the seed sown, may be adjusted to the necessary weight to accomplish the desired purpose by filling or partially filling it with water or other fluid, which, from its nature, will always occupy the lowest position. This roller, in its travel over the ground, rotates around a hollow axle, B, connected with a tubular frame, C, and the eye of the roller at each end is made water-side, around the axle by a bolt from side to side, having suitably-formed connections I in the tubular frame against the ends of the roller. In the rear of the roller, and somewhat above it, is an air-chamber, D, which is connected, at or near each end, with the hollow frame C, through which and the hollow axle B, with its stand-pipe E, the air has free passage into the upper portion of the roller. The tubular frame C is diaphragmed immediately in rear of one of the hollow journals, as at G, and in front of the hollow journal at the opposite side, near the hose or spray pipe H, as at G', so that a trifle more than half the capacity of the frame is occupied by air in connection with the air-chamber D, while the other portion forms the passage for the water or fertilizer from the roller, through the pendent tube R and hollow axle, to the hose-pipe H. J is an air-pump, seated on and communicating with the hollow frame C at one side of the apparatus, and is operated by a walking-beam, K, through a gear-wheel, L, pinion N, and crank P, or other suitable mechanism, put in motion by the rotation of the roller A in passing over the ground. This pump may be either single or double acting, and is controlled by stop-cocks suitably arranged, so as either to force air into the chamber D or to exhaust it therefrom, at the will of the operator.

In using this apparatus it is first drawn a sufficient distance over the ground, with the air-pump properly adjusted to exhaust the air from the chamber D and roller A, producing a vacuum, after which the nozzle Q may be dipped in any convenient pool or reservoir of water or other liquid, and the stop-cock S opened, when the roller will immediately fill to the desired weight with such liquid. The apparatus is then in suitable condition to be used as a roller, for the purposes above stated, during which operation or use the pump is to be reversed, so as to force air into the chamber D and other cavities, to produce sufficient pressure therein to expel the water or other liquid whenever desired, either to irrigate the ground, or to distribute a fertilizer or poisonous liquid or powder thereon. In case powdered manure or poison is used, its surface will, by the rotation of the roller, assume a diagonal position therein, so that the discharge-pipe R, pendent from the hollow axle, will dip but very little into the bulk, which is constantly agitated by the motion of the roller.

When the roller is not required for any of the purposes above named, or in its travel homeward after having performed such service, the pump may be so adjusted as to force air into the chamber D, roller A, and other cavities, until a high pressure therein is obtained. The force of this compressed air may then be used to operate any light machinery when the apparatus is stationary, as before mentioned.

Having thus fully described my invention, its operation and uses, what I claim as new, and desire to secure by Letters Patent, is—

1. A roller-irrigator, provided with a reversible air-pump, all constructed and operated in the manner shown and described, so as to be self charging and discharging, substantially as and for the purposes specified.

2. The combination of the roller A, air-chamber D, hollow frame C, and air-pump J, for operation substantially as shown and described.

D. S. HOWARD.

Witnesses:
   Jos. T. K. Plant,
   W. Morris Smith.